United States Patent [19]
Shmulovich et al.

[11] Patent Number: 5,526,371
[45] Date of Patent: Jun. 11, 1996

[54] PUMPING ARRANGEMENTS FOR ARRAYS OF PLANAR OPTICAL DEVICES

[75] Inventors: Joseph Shmulovich, Murray Hill; Yiu-Huen Wong, Summit, both of N.J.

[73] Assignee: AT&T Corp., Murray Hill, N.J.

[21] Appl. No.: 372,261

[22] Filed: Jan. 13, 1995

Related U.S. Application Data

[62] Division of Ser. No. 124,127, Sep. 20, 1993, Pat. No. 5,448,586.

[51] Int. Cl.⁶ .............................. H01S 3/091; G02B 6/12
[52] U.S. Cl. .................. 372/68; 372/70; 372/75; 385/131; 385/132; 385/142; 359/343; 359/345
[58] Field of Search .................................. 372/70, 75, 68, 372/50; 385/129–132, 141, 142; 359/342, 343, 345

[56] References Cited

U.S. PATENT DOCUMENTS

| | | | |
|---|---|---|---|
| 5,119,460 | 6/1992 | Bruce et al. | 385/141 |
| 5,139,609 | 8/1992 | Fields et al. | 372/50 |
| 5,365,538 | 11/1994 | Tumminelli et al. | 372/66 |

*Primary Examiner*—Rodney B. Bovernick
*Assistant Examiner*—Robert McNutt

[57] ABSTRACT

Plural planar optical devices are simultaneously pumped by a single pumping source. Various arrangements for accomplishing such pumping are disclosed. By utilizing these arrangements, the topology and routing of integrated arrays including optical devices are simplified.

8 Claims, 4 Drawing Sheets

PUMPING ARRANGEMENTS FOR ARRAYS OF PLANAR OPTICAL DEVICES

This is a division of application Ser. No. 08/124,127 filed Sep. 20, 1993, now U.S. Pat. No. 5,448,586.

BACKGROUND OF THE INVENTION

This invention relates to planar optical devices and, more particularly, to arrangements for pumping integrated arrays of such devices.

A variety of optical devices made in the form of planar optical waveguides are known. Multiple such devices can be fabricated in an integrated fashion on a substrate to provide a microminiature component that is useful in optical signal processing networks.

advantageous planar device that functions as an optical amplifier is described in U.S. Pat. No. 5,119,460. The device described therein amplifies optical signals by stimulated emission from erbium ions. Erbium ions are excited to a lasing level by coupling pumping radiation into an active erbium-doped region of the device.

In accordance with the teachings of the aforecited patent, signal and pumping radiation are combined and then injected into the active region of each device (see, for example, FIG. 2 of the patent). For large integrated arrays made on a single substrate, such device-by-device pumping can obviously lead to complicated topologies and difficult routing problems.

Accordingly, efforts have continued by workers skilled in the art directed at trying to improve the structural arrangement of planar optical amplifiers in an integrated array. In particular, these efforts have been directed at trying to devise a more effective way of pumping the amplifiers. It was recognized that these efforts, if successful, could lead to more compact and lower-cost integrated arrays for use in optical signal processing networks.

SUMMARY OF THE INVENTION

In accordance with the principles of the present invention, plural planar optical amplifiers in an integrated array are simultaneously pumped by a single pumping source. In any case, the number of pumping sources in the array is smaller than the number of amplifiers to be pumped. In one embodiment, the pumping arrangement comprises a single optical source for applying a pumping signal to a loop-configured planar optical waveguide having branches that are disposed adjacent to and in coupling relationship with plural active waveguide regions to be excited. In another embodiment, the output of an elongated optical source that is disposed parallel to an array of active waveguide regions is coupled to the active regions via a microlens. In yet another embodiment, a slab waveguide whose width approximates the length of each active region of an array of regions is transversely disposed and in coupling relationship with respect to the array. The output of an elongated pumping source is coupled to one end of the slab waveguide, thereby to simultaneously couple the pumping signal into each active region of the array.

BRIEF DESCRIPTION OF THE DRAWING

A complete understanding of the present invention and of the above and other features and advantages thereof will be apparent from the detailed description below taken in conjunction with the accompanying drawing, not drawn to scale, in which.

DETAILED DESCRIPTION

For the purpose only of providing a particular illustrative example, the planar waveguide devices included in the integrated arrays described below will be assumed to be optical amplifiers comprising erbium-doped active regions. It is emphasized, however, that the various arrangements to be described are not limited to devices in which erbium-doped regions are pumped. The inventive arrangements are generic in nature and thus are also clearly applicable to pumping a variety of other known active devices in which emission occurs from ions other than erbium ions.

The particular erbium-doped amplifiers assumed herein are used to amplify optical signals by stimulated emission from $Er^{3+}$ ions. As is well known in the art, the appropriate signal wavelength for such an amplifier is about 1.55 micrometers. Various wavelengths of pumping radiation (for example, wavelengths of 514 nanometers, 660 nanometers, 810 nanometers, 980 nanometers and 1.48 micrometers) are effective to excite $Er^{3+}$ ions, as described in greater detail in the aforecited patent.

Figure 1:
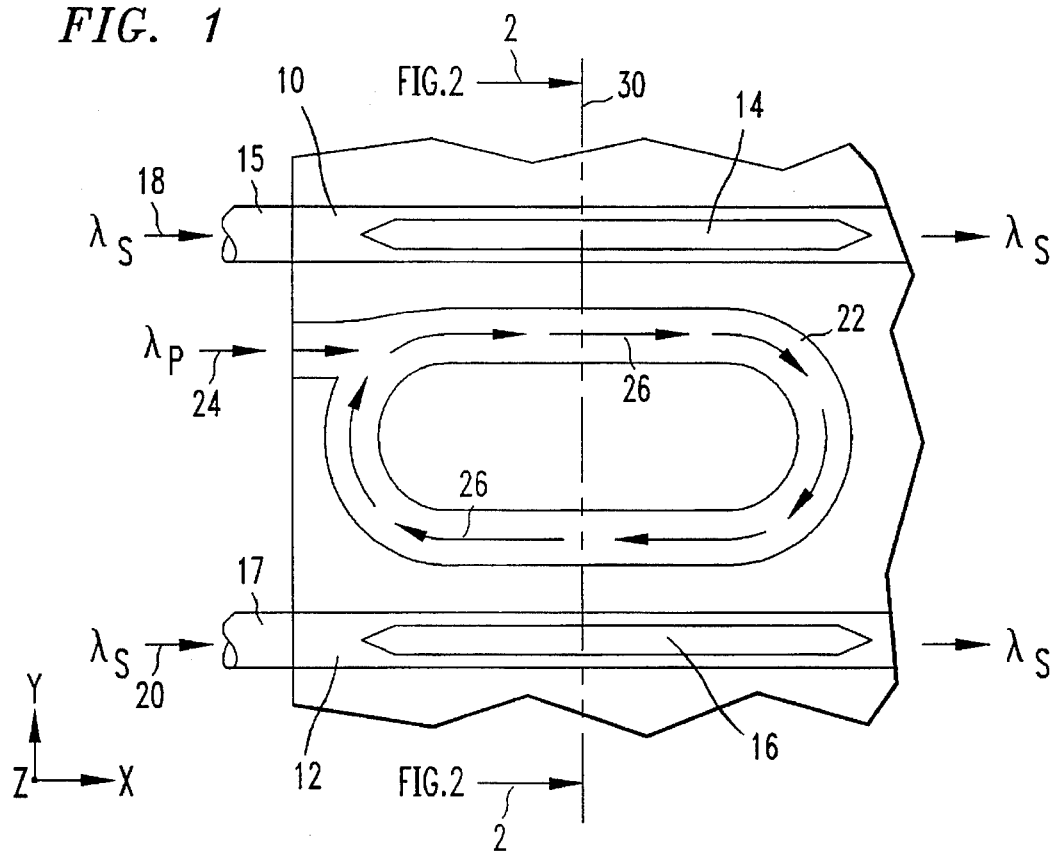
FIG. 1 is a top view of a portion of a specific illustrative integrated array, including a loop-configured waveguide, that embodies the principles of the present invention.

The specific illustrative integrated array partially shown in FIG. 1 includes two passive waveguides 10 and 12 having active erbium-doped tapered waveguide regions 14 and 16 (for adiabatic coupling) formed on the respective surfaces of the waveguides 10 and 12. Illustratively, optical signals are applied to the left-hand ends of the waveguides 10 and 12 from single-mode optical fibers 15 and 17, as indicated by arrows 18 and 20.

In accordance with the invention, an appropriate pumping signal for the active waveguide regions 14 and 16 is coupled thereto by a loop-configured passive waveguide 22. The Y-direction width and Z-direction height of the waveguide 22 are, for example, approximately the same as the corresponding dimensions of the passive waveguides 10 and 12. Top and bottom branches of the loop-configured waveguide 22 are respectively disposed closely adjacent to the active regions 14 and 16.

An appropriate pumping signal is applied to the left-hand end of the waveguide 22 of FIG. 1, as indicated by arrow 24. Such a signal, which is provided, for example, by a continuously operating laser, is guided by the waveguide 22 to repetitively propagate around the loop-shaped extent thereof, as represented by arrows 26. Repetitive traversal of the pumping signal through the top and bottom branches of the waveguide 22 enhances the absorption of pumping radiation by $Er^{3+}$ ions in the active regions 14 and 16.

As shown in FIG. 1, the loop-configured waveguide 22 is utilized to simultaneously pump two active regions 14 and 16. By extending the waveguide 22 in the X direction to form a longer loop, it is feasible thereby to provide longer top and bottom branches. Portions of these longer branches can then be coupled to additional active regions (not shown), disposed on other passive waveguides in the same integrated array.

Figure 2:
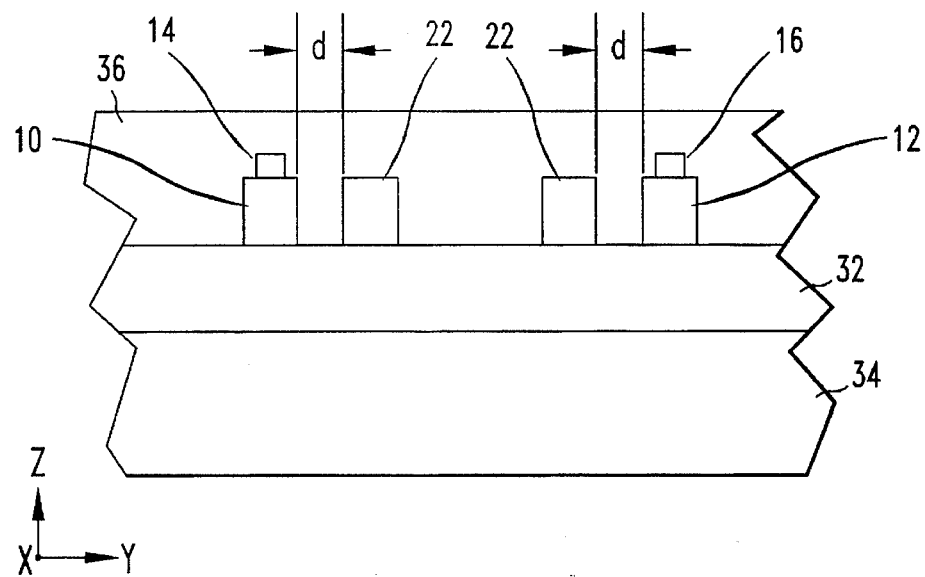
FIG. 2 is a cross-sectional representation of the FIG. 1 array, with an upper cladding layer added thereto.

FIG. 2 is a cross-sectional depiction of the FIG. 1 arrangement at the line 30 as viewed in the direction of arrows 2. In FIG. 2, the waveguides 10, 12 and 22 are shown disposed on a lower cladding layer 32 which overlies a substrate 34. Also shown in FIG. 2 are the active regions 14 and 16 and an upper cladding layer 36.

Each of the waveguides 10, 12 and 22 of FIG. 2, as well as each of the active waveguide regions 14 and 16, is substantially surrounded by the cladding layers 32 and 36. The refractive indices of the cladding layers 32 and 36 are selected to be less than the refractive indices of the waveguides 10, 12 and 22 and also less than the refractive indices of the active regions 14 and 16. As a result of these refractive index differences, electromagnetic radiation at the signal wavelength is guided in the waveguides 10 and 12 and in the active regions 14 and 16, and radiation at the pumping wavelength is guided in the waveguide 22 and coupled to the regions 14 and 16 when the separation between the waveguide 22 and the regions 14 and 16 is small.

Additionally, the index of refraction of each of the active regions 14 and 16 of FIG. 2 is preferably designed to be somewhat greater than the refractive index of its respective underlying waveguide. In that way, the greatest possible amount of light is captured in the active regions 14 and 16.

Illustratively, the waveguides 10 and 12 and the active regions 14 and 16 of FIG. 2 function as single-mode waveguides for signal radiation applied thereto from associated single-mode optical fibers. The waveguide 22, on the other hand, can function either as a single-mode or multimode waveguide with respect to pumping radiation that is applied to its input end.

In one specific illustrative example, the lower cladding layer 32 of FIG. 2 is formed on an appropriately prepared planar top surface of a substrate 34 that comprises a silicon wafer. The layer 32 is, for example, a layer of vitreous silicon dioxide which is grown by a standard technique that involves thermal oxidation of silicon under high pressure steam. The thickness of the layer 32 should be greater than about ten micrometers, because optical leakage may occur at substantially smaller thicknesses. In one embodiment, the thickness of the layer 32 is, for example, approximately fifteen micrometers.

Each of the waveguides 10, 12 and 22 of FIG. 2 is made, for example, from phosphosilicate glass that is deposited on the cladding layer 32 and then patterned. The phosphorus content, and thus the refractive index, of the deposited glass is selected to provide the desired waveguiding properties, in accordance with techniques well known in the art. Each of the waveguides 10, 12 and 22 has, for example, a Y-direction width of about six micrometers and a Z-direction height of also approximately six micrometers.

Illustratively, the active regions 14 and 16 of FIG. 2 are each made from a silica-based glass having a relatively high concentration of erbium, such as, for example, glass having an erbium-to-silicon atomic ratio of about 0.01.

An exemplary method for depositing the active regions 14 and 16 of FIG. 2 is by sputtering, as described in detail in the aforecited patent. As noted earlier above, the refractive index of each of the active regions 14 and 16 should advantageously be greater than the index of its respective underlying waveguide (waveguide 10 or waveguide 12).

The Z-direction thickness of each of the active regions 14 and 16 is, for example, about 1.5 micrometers. The Y-direction width of each of the regions 14 and 16 (except for the tapered ends thereof) is approximately four to six micrometers. And, illustratively, the X-direction length of each of the active regions 14 and 16 is about three to five centimeters.

The upper cladding layer 36 shown in FIG. 2 is advantageously made of phosphosilicate glass, exemplarily by standard low-pressure chemical vapor deposition techniques. The Z-direction thickness of the layer 36 is, for example, about ten to fifteen micrometers.

In accordance with the invention, the pumping signal that is guided to repeatedly propagate around the loop-configured waveguide 22 shown in FIGS. 1 and 2 is effective to simultaneously couple pumping energy into both of the active regions 14 and 16. In that way, pumping radiation is absorbed by ions in each of these regions, thereby promoting at least some of the ions therein to a state that is a lasing level of atomic excitation, as is well known in the art.

In one particular illustrative example, the Y-direction distance d (FIG. 2) between the facing sidewalls of the pumping waveguide 22 and each of the signal waveguides 10 and 12 is approximately one micrometer or less along substantially the entire lengths of the waveguides 10 and 12 that respectively underlie the active regions 14 and 16. Such a spacing provides effective coupling of radiation from the pumping signal propagating in the waveguide 22 into the active regions 14 and 16.

For illustrative purposes, each of the embodiments described herein shows active regions formed on top of their respective waveguides. But it is also feasible to form the active regions as part of or even as the entirety of the signal-carrying waveguides. Also, the pumping waveguide 22 shown in FIGS. 1 and 2 could alternatively in a multilayer structure be formed, for example, on top of the regions to be pumped.

Figure 3:
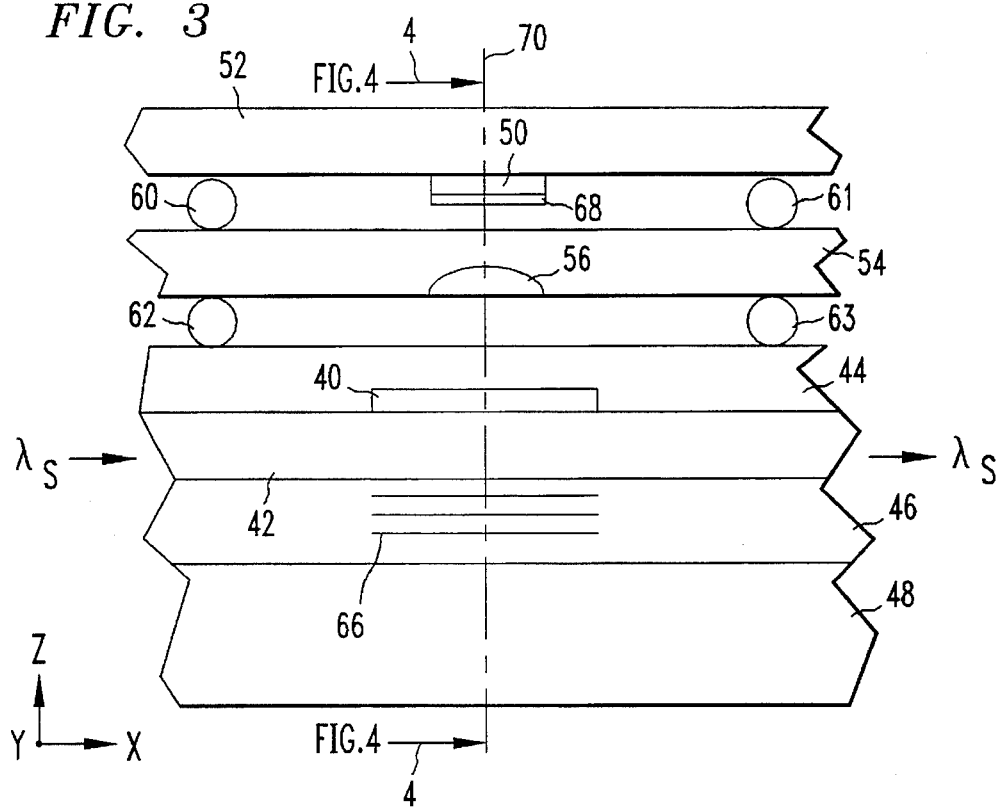
FIG. 3 is a cross-sectional side view of an embodiment of the invention in which an elongated optical source is coupled to plural active regions via a microlens.

Another specific illustrative embodiment of the present invention in which plural active regions are simultaneously excited from a single pumping source is depicted in FIG. 3. In particular, FIG. 3 shows one such active region 40 formed on a passive waveguide 42. As in the earlier-described arrangement of FIGS. 1 and 2, the FIG. 3 structure includes upper and lower cladding layers 44 and 46, respectively, and a substrate 48.

Pumping of the active region 40 and of other adjacent active regions of FIG. 3 is accomplished by an elongated optical source 50 disposed on a supporting substrate 52. The source 50 comprises, for example, a conventional surface-emitting laser array which provides multiple downwardly projecting laser beams emanating from a longitudinal axis of the source 50 that is parallel to the indicated X axis. These beams are projected onto plural active regions of the FIG. 3 arrangement by a lens component 54.

Illustratively, the lens component 54 of FIG. 3 comprises a slab made, for example, of quartz. A cavity 56 is formed in the bottom surface of the slab to serve as a concave spherically shaped microlens. This microlens is designed to project the output of the elongated optical source 50 onto the entire X-direction extent of the active region 40. Additionally, the microlens formed in the component 54 is designed to project the output of the source 50 onto a relatively large area in a plane parallel to the indicated X-Y plane. In particular, this area has a Y-direction extent that exceeds the Y-direction width of the source 50 and is sufficiently wide to encompass multiple active regions including the active region 40. Moreover, the output of the source 50 is projected by the lens component 54 to encompass the entire X-direction extent of all such multiple active regions.

As shown in FIG. 3, the source 50 is spaced apart from the lens component 54 (by, for example, about 300 micrometers), and the component 54 is spaced apart from the top surface of the upper cladding layer 44 (also by, for example, approximately 300 micrometers). Illustratively, such spacing is provided by precision-ground balls 60 through 63 that are respectively positioned in pairs of accurately formed depressions in the facing surfaces that are to be spaced apart.

FIG. 3 also includes a so-called resonant mirror stack 66 which comprises multiple alternating layers of dielectrics such as silicon and silicon dioxide spaced apart from each other by a quarter wavelength of the pumping frequency. Such stacks are described: for example, in an article entitled "Giant Enhancement of Luminescence Intensity in Er-doped $Si/SiO_2$ Resonant Cavities", by E. F. Schubert et al., *Applied Physics Letters*, Vol. 61, No. 12, Sep. 21, 1992, pages 1381–1383.

The stack 66 of FIG. 3, which acts in effect as a three-dimensional grating, is designed to serve as a reflector for pumping radiation. More specifically, the stack 66 thereby improves the efficiency of the pumping operation.

Illustratively, it is also advantageous to include a reflecting layer 68 on the bottom or output face of the pumping source 50 shown in FIG. 3. Such a layer, which is designed to reflect the pumping wavelength, is effective to further enhance the efficiency of the pumping operation.

Figure 4:
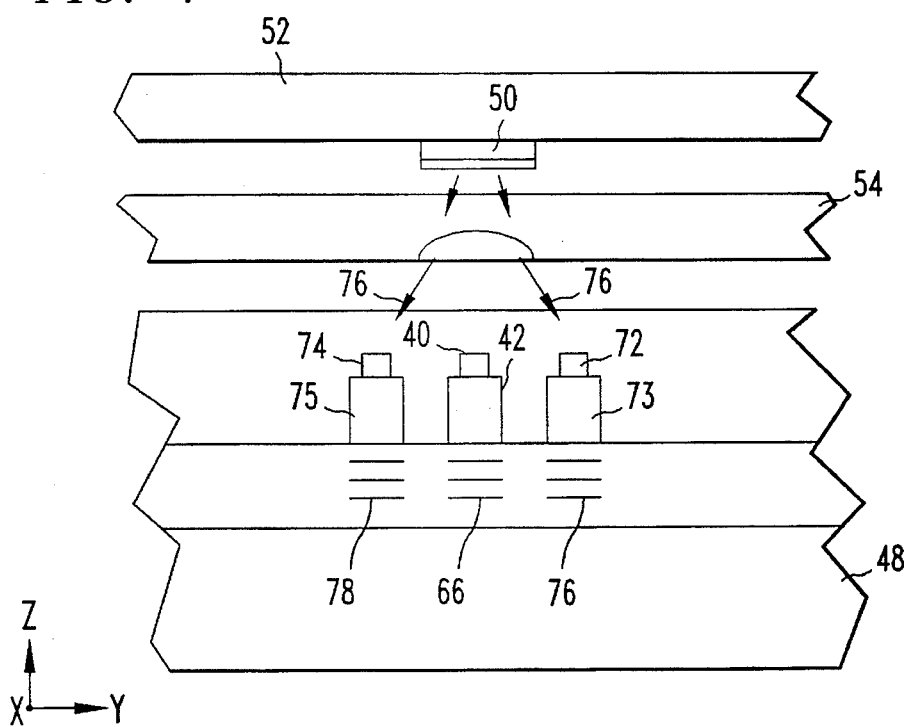
FIG. 4 is a cross-sectional end view of the embodiment depicted in FIG. 3.

FIG. 4 is a cross-sectional depiction of the FIG. 3 arrangement at the line 70 as viewed in the direction of arrows 4. As indicated in FIG. 4, pumping light emanating from the source 50 is directed by the lens component 54 to impinge upon the active region 40 as well as upon two additional active regions 72 and 74 which are disposed on passive waveguides 73 and 75, respectively. The path of pumping light rays provided by the microlens in the component 54 is approximated by arrows 76.

FIG. 4 also shows the previously described mirror stack 66 that underlies the active region 40 and its supporting passive waveguide 42. Further, two additional identical such stacks 76 and 78 that respectively underlie the waveguides 73 and 75 are also depicted in FIG. 4. The alternating layers that constitute the stacks 66, 76 and 78 have an X-direction length that is approximately co-extensive with the length of the active regions 40, 72 and 74.

Figure 5:
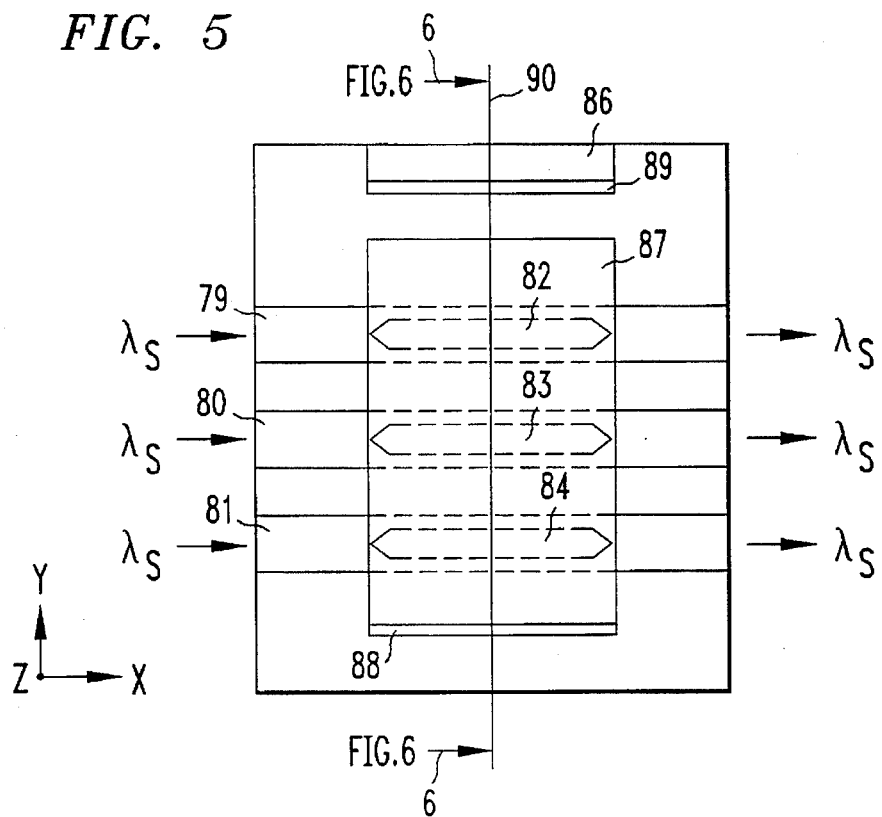
FIG. 5 is a top view of a portion of an embodiment of the invention in which a transversely disposed slab waveguide is utilized to pump plural active regions.

FIG. 5 is a top view of a portion of another illustrative embodiment made in accordance with the principles of the present invention. The FIG. 5 arrangement includes three passive waveguides 79 through 81 adapted to propagate optical signals. Active waveguide regions 82 through 84 are respectively disposed on the passive waveguides 79 through 81.

Pumping of the active regions 82 through 84 of FIG. 5 is accomplished by an elongated optical source 86 whose output is applied to the input face of a slab waveguide 87. The X-direction width of the waveguide 87 approximates the X-direction length of the active regions 82 through 84.

Illustratively, the pumping source 86 comprises a conventional elongated array of lasers or light-emitting diodes. In any case, the source 86 provides multiple output beams each emanating from spaced-apart areas centered along a line of the source that is parallel to the indicated X axis. In that way, each of the active regions 82 through 84 is pumped by light from the source 86 that propagates in the slab waveguide 87 in a direction orthogonal to the direction of signal propagation in the waveguides 79 through 84.

The slab waveguide 87 shown in FIG. 5 is made, for example, of a light-conducting material such as phosphosilicate glass. The composition of the waveguide 87 is selected such that it exhibits a higher index of refraction than the upper and lower cladding layers associated with the waveguides 79 through 84 but lower than the refractive index of the active regions 82 through 84. In that way, pumping light is confined to propagate in the slab waveguide 87 and a substantial portion thereof is coupled into the active regions 82 through 84.

To enhance the efficiency of the pumping operation, it is advantageous to include a reflecting layer 88 on the end face of the slab waveguide 87. The layer 88 is reflective at the pumping frequency. Also, to further improve the pumping efficiency, it is feasible to include a similar reflecting layer 89 on the output face of the elongated source 86.

Figure 6:
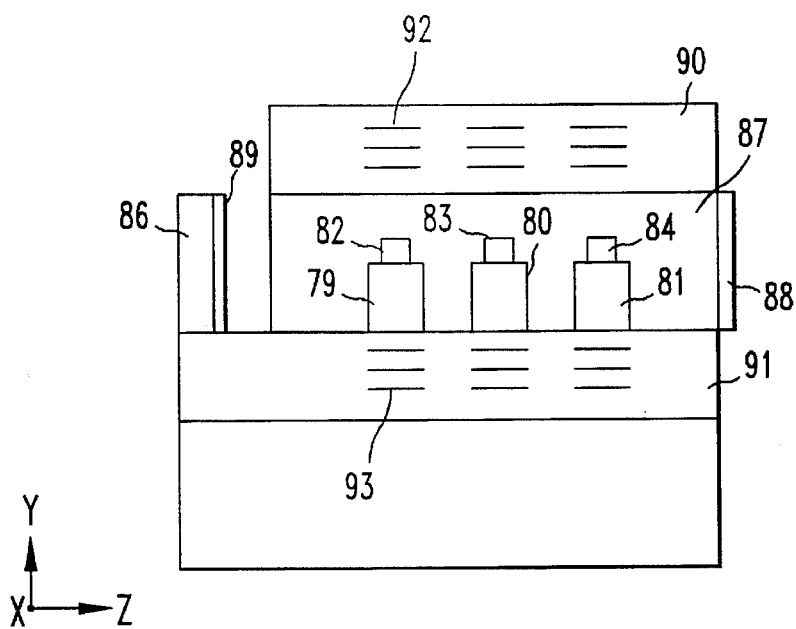
FIG. 6 is a cross-sectional end view of the FIG. 5 arrangement, with an upper cladding layer added thereto.

FIG. 6 is a cross-sectional depiction of the FIG. 5 arrangement at the line 90 as viewed in the direction of arrows 6. FIG. 6 shows the cladding layers 90 and 91 that are respectively disposed above and below the slab waveguide 87. Other components of FIG. 6 are identified by the same reference numerals utilized therefor for corresponding elements in FIG. 5.

In the arrangement shown in FIGS. 5 and 6, it is advantageous to form a pair of resonant mirror stacks associated with each active waveguide region. Thus, for example, stacks 92 and 93 are shown in FIG. 6 respectively positioned above and below the active region 82. These stacks, as well as those associated with the active regions 83 and 84, extend in the indicated X direction co-extensively with the X-direction length of the active regions 82 through 84.

Each pair of resonant mirror stacks shown in FIG. 6 is tuned to the frequency of the signal that is designed to propagate in its associated active region. The stacks serve to enhance the spontaneous emission characteristic of the active regions 82 through 84. In that, way, the signal-to-noise ratio of the arrangement is improved.

Figure 7:
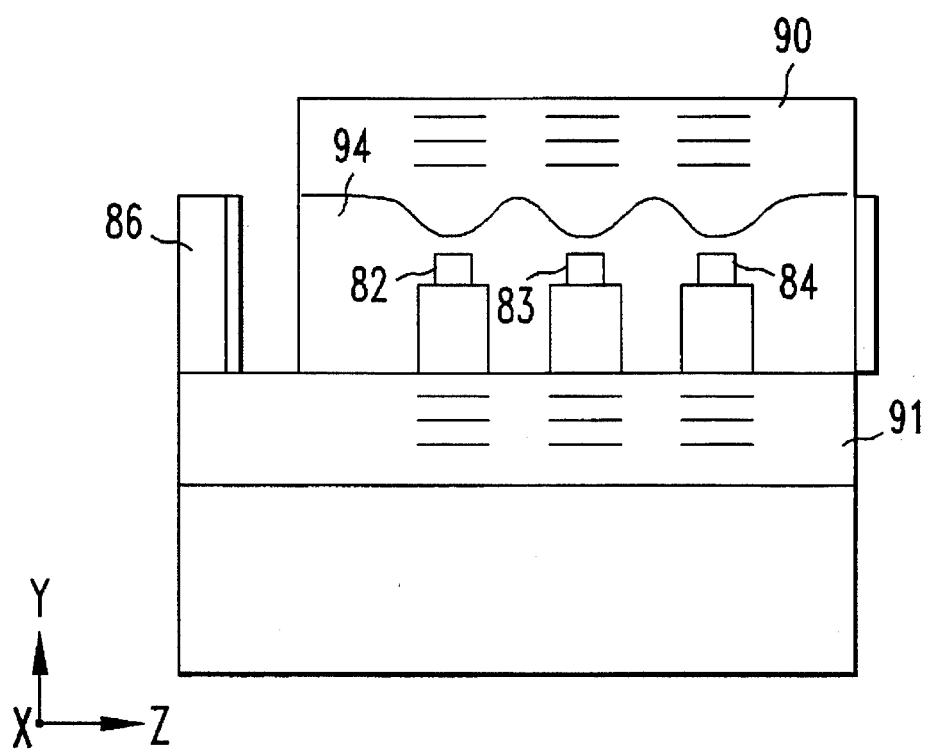
FIG. 7 is a cross-sectional end view of a modified version of the embodiment shown in FIGS. 5 and 6.

FIG. 7 shows an advantageous variant of the structure represented in FIGS. 5 and 6. In the FIG. 7 arrangement, the slab waveguide utilized to propagate the pumping signal is shaped to improve the coupling of pumping energy into the active regions 82 through 84. In particular, the upper surface of the slab waveguide 94 of FIG. 7 is shaped such that the thickness of the waveguide 94 is thinned directly over the entire X-direction length of each of the active regions 82 through 84. In one specific illustrative embodiment, the Y-direction thickness of the slab waveguide 94 directly over each of the active regions 82 through 84 is only about two micrometers. In that way, a substantial portion of the pumping signal is confined to propagate in an extremely close coupling relationship with respect to the active regions.

Finally, it is to be understood that the above-described arrangements are only illustrative of the principles of the present invention. In accordance with these principles, numerous modifications and alternatives may be devised by those skilled in the art without departing from the spirit and scope of the invention. For example, although emphasis herein has been directed to optical amplifiers, it is to be understood that the principles of this invention are applicable to any active optical device that requires pumping such as, for instance, lasers or radiation transformers (e.g., up- or down-converters). Also, in the particular illustrative embodiment depicted in FIGS. 3 and 4, it is feasible to substitute multiple distributed microlenses or holographic or prism elements for the single-microlens component 54. Furthermore, in the exemplary embodiments shown in FIGS. 5 through 7, it is feasible to couple pumping energy into the active regions via a slab waveguide in a longitudinal rather than in a transverse manner.

What is claimed is:

1. Apparatus comprising plural planar active optical devices, means including a single pumping source for simultaneously pumping said devices by coupling a pumping signal to said devices from said single pumping source, wherein each of said devices comprises an active region containing ions capable of being excited to a specified inverted level by said pumping source, means for coupling an optical signal into and out of each of said active regions, wherein said means for coupling an optical signal into and out of each of said active regions comprises planar waveguides respectively associated with said active regions, wherein each of said active regions comprises a waveguide section having a main longitudinal axis, a substrate having a substantially planar principal surface, a first cladding layer disposed on said principal surface, wherein said planar waveguides are disposed on said first cladding layer, and wherein said means for simultaneously pumping said devices comprises an elongated optical source having a main longitudinal axis that is parallel to the longitudinal axes of said active waveguide sections, and means interposed between said optical source and said active sections for projecting light from said source simultaneously in parallel onto the entire longitudinal extent of each of said active sections.

2. Apparatus as in claim 1 wherein said means interposed between said optical source and said active sections comprises a microlens.

3. Apparatus as in claim 2 further including a second cladding layer disposed on said first cladding layer and covering exposed surfaces of said active waveguide sections and exposed surfaces of said planar waveguides.

4. Apparatus as in claim 3 wherein the index of refraction of each of said planar waveguides is greater than the index of refraction of said first and second cladding layers, and wherein the index of refraction of said active waveguide sections is greater than the index of refraction of said planar waveguides.

5. Apparatus as in claim 4 further including means for maintaining said microlens in a spaced-apart aligned relationship with respect to said source and with respect to said second cladding layer.

6. Apparatus comprising plural planar active optical devices, means including a single pumping source for simultaneously pumping said devices by coupling a pumping signal to said devices from said single pumping source, wherein each of said devices comprises an active region containing ions capable of being excited to a specified inverted level by said pumping source, means for coupling an optical signal into and out of each of said active regions, wherein said means for coupling an optical signal into and out of each of said active regions comprises planar waveguides respectively associated with said active regions, wherein each of said active regions comprises a waveguide section having a main longitudinal axis, a substrate having a substantially planar principal surface, a first cladding layer disposed on said principal surface, wherein said planar waveguides are disposed on said first cladding layer, wherein said means for pumping said devices comprises an elongated optical source having a main longitudinal axis that is parallel to the longitudinal axes of said active waveguide sections, and means interposed between said optical source and said active sections for directing light from said source along the longitudinal extent of said active sections, wherein said means interposed between said optical source and said active sections comprises a microlens, further including a second cladding layer disposed on said first cladding layer and covering exposed surfaces of said active waveguide sections and exposed surfaces of said planar waveguides, wherein the index of refraction of each of said planar waveguides is greater than the index of refraction of said first and second cladding layers, and wherein the index of refraction of said active waveguide sections is greater than the index of refraction of said planar waveguides, further including means for mounting said microlens in a spaced-apart aligned relationship with respect to said source and with respect to said second cladding layer, and wherein said microlens comprises a slab having a spherical concave depression in the surface thereof that faces said second cladding layer.

7. Apparatus as in claim 6 further including resonant mirror stacks in said first cladding layer respectively underlying said active waveguide sections, said stacks being designed to reflect the pumping wavelength.

8. Apparatus as in claim 7 further including a reflector on the output face of said optical source for reflecting the pumping wavelength.

* * * * *